United States Patent [19]

Nicholson

[11] Patent Number: 4,665,437
[45] Date of Patent: May 12, 1987

[54] ADAPTIVE FIELD OR FRAME STORE PROCESSOR

[75] Inventor: Warren H. Nicholson, Plainsboro, N.J.

[73] Assignee: RCA Corporation, Princeton, N.J.

[21] Appl. No.: 697,884

[22] Filed: Feb. 4, 1985

[51] Int. Cl.⁴ .......................... H04N 5/04; H04N 5/14
[52] U.S. Cl. ..................... 358/148; 358/160; 358/158
[58] Field of Search ................ 358/21 R, 31, 36, 140, 358/148, 150, 154, 153, 158, 160, 167

[56] References Cited

U.S. PATENT DOCUMENTS

| | | | |
|---|---|---|---|
| 4,240,105 | 12/1980 | Faroudja | 358/31 |
| 4,335,403 | 6/1982 | Srivastava | 358/148 |
| 4,400,719 | 8/1983 | Powers | 358/21 R |
| 4,415,931 | 11/1983 | Dischert | 358/242 |
| 4,426,661 | 1/1984 | Okada et al. | 358/140 |
| 4,454,531 | 1/1984 | Elmis et al. | 358/17 |
| 4,593,315 | 6/1986 | Willis et al. | 358/140 |

FOREIGN PATENT DOCUMENTS 5923971 7/1982 Japan.
2102651 2/1983 United Kingdom.

Primary Examiner—James J. Groody
Assistant Examiner—Michael D. Parker
Attorney, Agent, or Firm—E. M. Whitacre; P. J. Rasmussen; K. N. Nigon

[57] ABSTRACT

Apparatus and a method for controlling the field or frame store signal processing of standard and nonstandard video signals is disclosed. The apparatus includes a nonstandard signal detector which compares the received horizontal sync signals to a horizontal sync signal generated internally be counting down a clock signal having a frequency proportional to the color subcarrier frequency. The detector produces a control signal which is in one state when the horizontal sync signals are substantially in coincidence and in a second state otherwise. This control signal is applied to apparatus which switches from field or frame store signal processing apparatus to alternative signal processing apparatus, which does not include a field or frame memory, to minimize distortion of the image when nonstandard signals are processed.

12 Claims, 6 Drawing Figures

ADAPTIVE FIELD OR FRAME STORE PROCESSOR

The present invention relates to apparatus and a method for controlling a field or frame store signal processor in the presence of nonstandard video signals.

Field and frame store memories may be used in such video signal processing systems as comb filters, progressive scan systems and temporal noise reduction systems. In each of these systems, samples that are separated by a field or frame time are combined to produce processed samples. These systems are generally designed to operate on signals that are well correlated from field to field or from frame to frame. When video signals are not well correlated because of interfield motion or because the signals are produced by a nonstandard source, the performance of the field or frame memory signal processor may be degraded.

It is desirable to at least partially defeat the field or frame processing when a lack of correlation is detected to minimize degredation of the reproduced image. For example, many frame memory signal processing systems include motion detectors which modify or circumvent the frame memory processing steps for portions of the image that display moving objects.

As set forth above, signals from nonstandard sources, or nonstandard signals, may be poorly correlated from field to field or frame to frame. As used in this application, the term nonstandard signal means a color video signal in which the ratio of the chrominance subcarrier frequency, $f_{sc}$, to the horizontal line frequency, $f_H$, deviates significantly from the defined standard. This ratio may be critical for sampled data video signal processing systems, such as digital television receivers. In these systems, the sampling rate is usually chosen to be a multiple of $f_{sc}$ to take advantage of signal interrelationships dictated by the particular video signal standard. For example, in the NTSC standard, the frequency $f_{sc}$ is the 455th harmonic of one-half of the line frequency $f_H$. Since $f_{sc}$ is a harmonic of one-half $f_H$, there is a 180° phase shift in the chrominance signal from line to line and from frame to frame, while there is no phase shift in the luminance signal components. This relationship is exploited by frame and line comb filters to separate the luminance and chrominance components of the composite video signals. When composite video samples taken at a $4f_{sc}$ rate are subtracted from samples delayed by one line or one frame time, the luminance components of the samples tend to cancel, leaving only the chrominance components. Similarly, when samples separated by one line or one frame are added, the chrominance components tend to cancel leaving only the luminance components. For a frame comb filter to be effective, the samples from the two frames should be closely aligned. If misaligned samples are applied to a comb filter, the luminance and chrominance components of the samples may be uncorrelated and, consequently, the comb filter may produce distorted chrominance and luminance signals.

Sample misalignment from a field to field or from frame to frame may be a problem for other types of field or frame memory signal processors as well. For example, when the average ratio of $f_{sc}$ to $f_H$ does not match the standard ratio, as in some video games and personal computers, the image may skew from field to field. This skew may cause a field progressive scan system to display a jagged image and may cause a uniform loss of horizontal image resolution for signals processed by a recursive noise reducing filter.

Misalignment problems can occur, however, even when the average ratio of $f_{sc}$ to $f_H$ matches the standard ratio, if the instantaneous ratio changes significantly from line to line. For example, in video tape recorders (VTR's) and in video disk players the line frequency, $f_H$, is determined by the speed of the tape or disc while the subcarrier frequency, $f_{sc}$, is determined by a piezoelectric crystal. Because of imperfections in the tape or disk, $f_H$ may vary significantly from line to line while $f_{sc}$ remains relatively fixed. This variation in the ratio of $f_{sc}$ to $f_H$ may produce distortion on the edges of objects for images processed by a frame or field comb filter, it may randomly reduce the horizontal resolution of a temporal noise reducing system and it may cause a progressive scan system to display a jagged image.

Nonstandard signal detectors exist which will discriminate between broadcast and cable television signals, which conform closely to the standard, and nonstandard video game or personal computer signals. Many of these detectors, however, may not be able to detect nonstandard signals from VTR's and video disk players.

U.S. Pat. No. 4,335,403 entitled "Horizontal Countdown System For Television Receivers" discloses one type of nonstandard signal detector. This detector compares a "processed sync pulse", having a 280 ns pulse width with a "flyback center pulse" having a 560 ns pulse width. Assuming that a 70 ns overlap is needed to detect coincidence, this system allows signals which may deviate from the standard by as many as six 70 ns samples in a horizontal line to pass as standard signals. These signals could seriously degrade the performance of a field or frame signal processor.

Another nonstandard signal detector is described in U.S. Pat. No. 4,454,531 entitled "Digital Circuit For Providing A Binary Signal On The Occurrence Of A Predetermined Frequency Ratio Of Two Signals". The detector described in this reference uses a counter to derive a horizontal line frequency pulse from a sampling clock signal which is fixed in frequency relative to the color subcarrier frequency. A monostable multivibrator, or one-shot, stretches these horizontal frequency pulses to be at least two clock periods wide. The stretched pulses are applied to the up/down input of a second counter and horizontal sync pulses, derived from the input signal, are applied to the clock input of the second counter. The second counter counts up for any horizontal sync pulse which falls within the window defined by the stretched horizontal line frequency pulse (i.e. for standard signals) and counts down for horizontal sync pulses which do not fall within this window (i.e. for nonstandard signals). If the value held by the second counter at the end of a field is above a predetermined threshold, the signals which generated the field are presumed to be standard and the value held by a third counter is incremented. If, however, the value held by the second counter at the end of a field falls below this threshold, the value held by the third counter is set to zero. When the value in the third ccunter reaches approximately 1000, the output signal of the detector changes to indicate that standard signals are being processed.

The 1000 field delay may make this detector unsuitable for use with a field or frame memory. A temporary loss of coincidence in an otherwise standard signals due to a change between two cameras, for example, may cause the detector to disable the field or frame memory processing, reducing the quality of the displayed image. In the NTSC system, the 1000 field delay would cause the low quality image to be displayed for 13 seconds before field or frame memory signal processing would be allowed to resume.

SUMMARY OF THE INVENTION

The present invention is an adaptive video signal processing system which uses at least one field of memory. The system includes a nonstandard signal detector which produces an output signal that has a first value when the horizontal line synchronizing signal components of the video signals have a frequency which closely conforms to the frequency ratio between the horizontal line synchronizing signal and the the color subcarrier signal set by the applicable standard and that has a second value otherwise. The nonstandard signal detector controls the signal processing system to minimize distortion of the reproduced image which may occur when nonstandard signals are processed with signals from a prior field.

DETAILED DESCRIPTION

Figure 1:
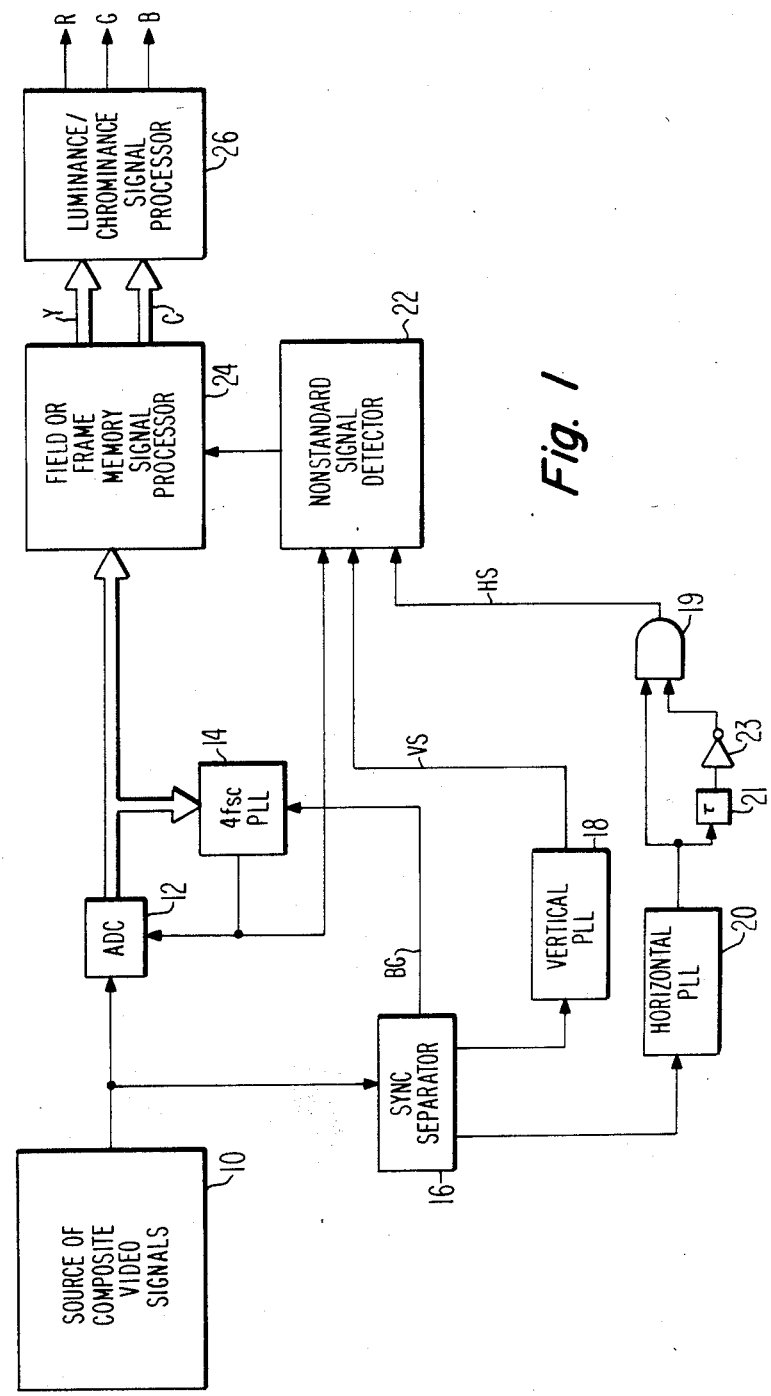
FIG. 1 is a block diagram of a portion of a digital television signal processing system incorporating an embodiment of the present invention.

In the drawings, broad arrows represent busses for multiple-bit parallel digital signals. Line arrows represent connections carrying analog signals or single bit digital signals. Depending on the processing speed of the devices, compensating delays may be required in certain of the signal paths. One skilled in the art of digital circuit design would know where such delays would be needed in his particular system.

In FIG. 1, a source of composite video signals 10, which may include the tuner, intermediate frequency amplifier and video detector of a conventional color television receiver, provides analog composite video signals to sync separator circuit 16. The sync separator 16 generates horizontal and vertical synchronization pulses and burst gate pulses from the analog composite video signals by conventional means. The horizontal synchronization pulses are applied to the horizontal phase locked loop (PLL) 20. PLL 20 produces a signal which is phase locked to the horizontal synchronization pulses from sync separator 16. Ideally, PLL 20 has a relatively wide lock-in range so that it may respond quickly to phase shifts in the horizontal synchronization pulses derived from the composite video signals. A suitable horizontal phase locked loop may be built from conventional components, such as the RCA CD4046A integrated circuit.

The PLL 20 is not an essential part of the present invention. Its primary function is to provide relatively noise-free horizontal synchronization signals. In systems where noise immunity is not an important design consideration, the PLL 20 may be removed.

The phase-locked horizontal line frequency pulses from PLL 20 are applied to pulse forming circuitry which includes AND gate 19, delay element 21 and inverter 23. The output terminal of PLL 20 is connected to delay element 21 and to one input terminal of AND gate 19. Delay element 21 provides delayed pulses to inverter 23, the output terminal of which is connected to the second input terminal of AND gate 19. The pulses provided by AND gate 19 start at substantially the same time as the pulses from PLL 20 but have a pulse width approximately equal to the delay provided by delay element 21. In the present embodiment, this delay is less than 140 ns so that the signal HS, provided by AND gate 19, is a horizontal line frequency pulse signal that is phase-locked to the horizontal sync component of the received composite video signal and that has a relatively narrow pulse width (i.e. less than two periods of the $4f_{sc}$ clock signal).

The vertical synchronization pulses from sync separator 16 are applied to a conventional vertical frequency PLL 18 which produces a vertical synchronization signal, VS. Signal VS is locked in frequency and phase to the vertical synchronization pulses derived from the composite video signals by sync separator 16.

The burst gate signal, BG, is applied by sync separator 16 to a PLL 14 which produces a sampling clock signal that has a frequency four times the frequency of the color subcarrier signal and that is phase-locked to the color synchronizing burst component of the composite video signals. PLL 14 may be a conventional digitally controlled PLL similar to the one disclosed in U.S. Pat. No. 4,291,332 entitled "Phase-Locked Circuit". The $4f_{sc}$ clocking signal provided by PLL 14 is applied to analog to digital converter (ADC) 12 to control the rate at which digital samples, representing the composite video signals from source 10, are produced by the ADC 12. Digital samples provided by ADC 12 are applied to PLL 14. PLL 14 uses the burst gate signal, BG, to extract from these composite video samples the color burst samples which are used to phase-lock the $4f_{sc}$ clock signals.

Although, in the present embodiment, the $4f_{sc}$ clock signal is phase-locked to the color burst signal, it is contemplated that the invention may also use a horizontal line-locked clock signal. A horizontal line-locked clock signal may be generated by phase locking the $4f_{sc}$ clock signal to the signal provided by a relatively narrow bandwidth horizontal frequency PLL. No horizontal line-locked clock signal generator is shown since it is not considered a part of the present invention.

The horizontal and vertical synchronization signals, HS and VS and the $4f_{sc}$ clock signal are applied to nonstandard signal detector 22.

Figure 2:
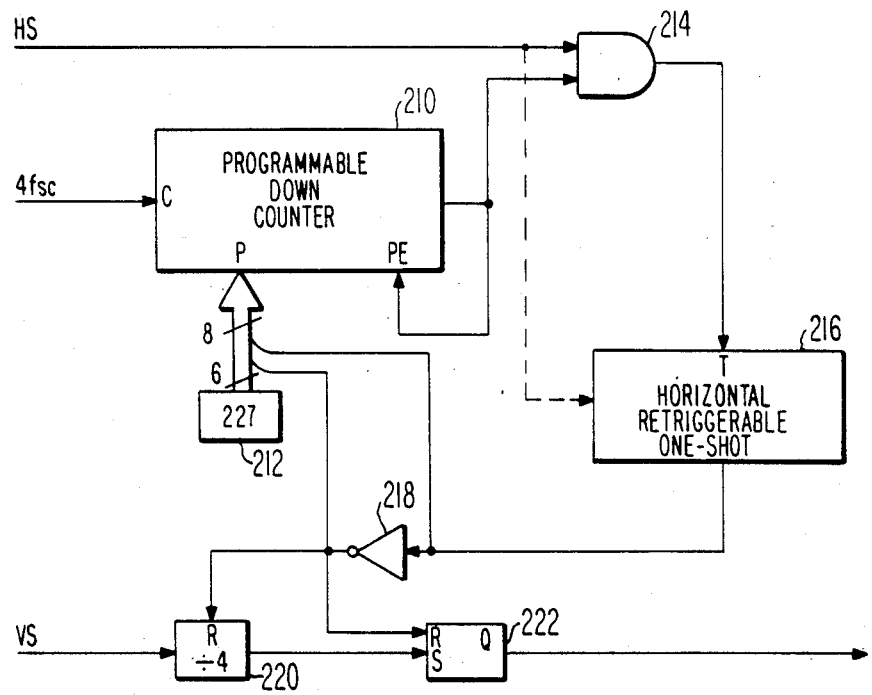
FIG. 2 is a block diagram showing a nonstandard signal detector suitable for use in the embodiment shown in FIG. 1.

FIG. 2 is a block diagram showing details of nonstandard signal detector 22. In this figure, the $4f_{sc}$ clock signal is applied to the count input terminal C of programmable down counter 210. An eight-bit digital value is applied to the preset input port P of counter 210 by digital value source 212, retriggerable one-shot 216 and inverter 218. As explained below, counter 210 may be preset to count down from one of two values. One of these values is used to change the phase of the horizontal sync signal provided by the down counter to align it to the phase of the received horizontal sync pulses. The other value is used to produce a horizontal sync signal which conforms to the ratio between $f_{sc}$ and $f_H$ set by the applicable signal standard when the phases of the two signals are aligned.

When the counter 210 counts down to zero, it produces a logic high output signal. This signal is applied to the preset enable input terminal (PE) of the counter 210. The logic high signal applied to terminal PE sets the counter to the value applied to its preset input port synchronous with the leading edge of the next $4f_{sc}$ clock pulse. Since the counter value is no longer zero after it is preset, the counter produces a logic low output signal. Accordingly, counter 210 produces output pulses that are approximately $1/(4f_{sc})$ wide at approximately one horizontal line (1H) time intervals.

The pulses from counter 210 are applied to one input terminal of AND gate 214. The horizontal sync signal, HS, from the AND gate 19 is applied to the other input terminal of AND gate 214. AND gate 214 is a coincidence detector. It produces an output pulse when the horizontal pulses from PLL 20 and from counter 210 overlap in time. This coincidence pulse is applied to the trigger input terminal, T, of horizontal retriggerable one-shot 216. One-shot 216 converts a coincidence pulse applied to its trigger input terminal into an output pulse that is a predetermined number of horizontal line periods wide. One-shot 216 is retriggerable, so that, once triggered, each subsequent coincidence pulse extends the output pulse of the one-shot by the predetermined number of horizontal line periods.

In the present embodiment, the output pulses provided by one-shot 216 are 25 horizontal line periods wide. Consequently, the output of the one-shot 216 maintains a logic high state if a coincidence is detected at least once in each 25 horizontal line intervals. This signal has been found to be a good indicator of standard or nonstandard signals; it is in a logic high state when the ratio between $f_{sc}$ and $f_H$ closely approximates the standard ratio and when the deviations about this ratio from line to line are minimal.

The output signal from one-shot 216 is inverted by inverter 218 and applied to the reset input terminals of the frequency divider 220 and the set-reset flip-flop 222. The vertical sync signal VS from PLL 18 is applied to the signal input terminal of frequency divider 220. Frequency divider 220, which frequency divides the field rate vertical sync signal by four, develops a signal that has a two-frame period and a 50% duty cycle. The output signal from frequency divider 220 is applied to the set input terminal of flip-flop 222.

When standard signals are being processed, the reset input signals to frequency divider 220 and flip-flop 222 are both in a logic low state and, after at least two fields of standard signal have been processed by the frequency divider 220, the set input signal to the flip-flop 222 is in a logic high state. Consequently, the signal provided by flip-flop 222 is in a logic high state.

When a nonstandard signal is detected, however, inverter 218 applies a logic high signal to the reset inputs of the frequency divider 220 and the flip-flop 222. This signal resets the frequency divider, changing the signal applied to the set input of the flip-flop 222 and the signal provided by the flip-flop to logic low signals. When the output signal from inverter 218 again changes to a logic low state, indicating that standard signals are being processed, the output signal from flip-flop 222 remains in a logic low state for one frame time. This delay allows the frame memory signal processing circuitry to store one frame of standard signals before frame processing is resumed.

As stated above, programmable down counter 210 may be preset to count down from one of two values. The six most significant bits of each of these values are supplied by source 212. The two least significant bits are supplied by inverter 218 and one-shot 216. In the present embodiment, the value provided by source 212 is $E3_{16}$ ($227_{10}$) (the subscripts 16 and 10 indicate hexadecimal and decimal notation respectively). When the two least significant bits are concatenated to this six bit value, preset values of $38D_{16}$ ($909_{10}$) and $38E_{16}$ ($910_{10}$) are obtained, corresponding to the output signal of the one-shot being in a logic high and a logic low state respectively.

When the counter 210 is preset to 909, one pulse is emitted by the counter for every 910 pulses of the $4f_{sc}$ clock signal. The counter cycles every 910 instead of 909 clock pulses because it has a synchronous preset. After the counter has processed 909 clock pulses to count from 909 to zero, a logic high signal is applied to its preset enable input and synchronous with the next clock pulse, the 910th, the counter is preset to 909.

When the counter 210 is preset to 910, the counter cycles every 911 clock pulses and the signal provided by the counter 210 has a frequency slightly less than $f_H$. In this mode, the pulses produced by the counter 210 drift relative to the horizontal sync pulses until a pulse provided by the counter 210 coincides with a horizontal sync pulse from AND gate 19. It is contemplated that the rate of drift between the horizontal sync pulses and the pulses provided by the counter may be changed by changing the difference between the two count values or by changing the magnitude of the count values to change the period of the signals produced by the counter to be a multiple or a fraction of a horizontal line period.

Figure 3:
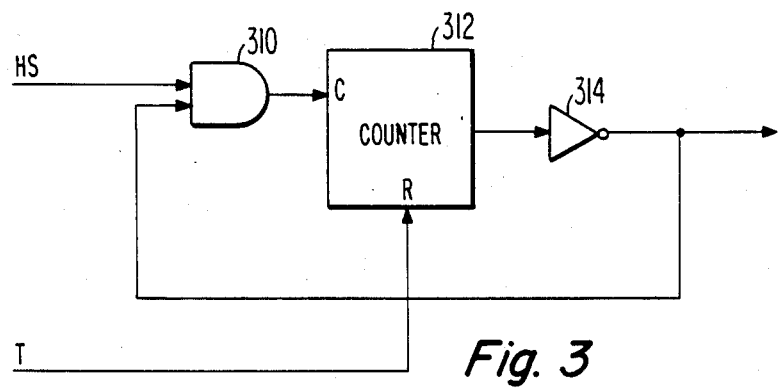
FIG. 3 is a block diagram of a digital retriggerable one-shot which may be used in the nonstandard signal detector shown in FIG. 2.

As described above, one-shot 216 may be a conventional monostable multivibrator, having a pulse-width time constant determined by a resistor-capacitor (RC) network. FIG. 3 shows an alternative implementation of the one-shot 216 which does not need an RC network. Horizontal sync pulses from PLL 20 are applied to the one-shot 216 as shown in phantom in FIG. 2. These horizontal sync pulses are applied to one input terminal of AND gate 310. The output signal of the AND gate 310 is applied to the count input terminal, C, of counter 312. The output terminal of counter 312 is connected to the input terminal of inverter 314 which provides the output signal of the one-shot. This output signal is applied to the second input terminal of AND gate 310. The trigger input terminal of the digital one-shot is the reset input terminal, R, of the counter 312.

When the output signal of the counter is in a logic high state (i.e. when the counter has counted to its maximum value), the output of inverter 314 is in a logic low state. The logic low signal from inverter 314 disables AND gate 310, so horizontal sync pulses are not applied to the count input terminal of the counter 312. When a pulse is applied to the reset terminal of counter 312, however, the output signal of the counter changes to a logic low state, and the inverter 314 applies a logic high signal to enable AND gate 310 to pass horizontal sync pulses. Counter 312 counts these pulses until it reaches its maximum value and once again disables the AND gate. In the present embodiment, the maximum value of the counter 312 is 25.

Referring again to FIG. 1, the nonstandard signal detector 22 applies its output signal to field or frame memory processor 24. Processor 24 may, for example, include a comb filter, a recursive noise reducing filter or an interlaced scan to progressive scan conversion systems. Processor 24 processes the digitized composite video samples applied to it by ADC 12. In this embodiment of the invention, processor 24 provides separated luminance and chrominance signals, Y and C respectively to luminance/chrominance signal processor 26. Processor 26 may include circuitry to demodulate the C signal into color difference signals and circuitry to combine the color difference signals with the luminance signal to produce the primary color signals R, G and B. These primary color signals may be used to drive a display device (not shown).

Figure 4A:
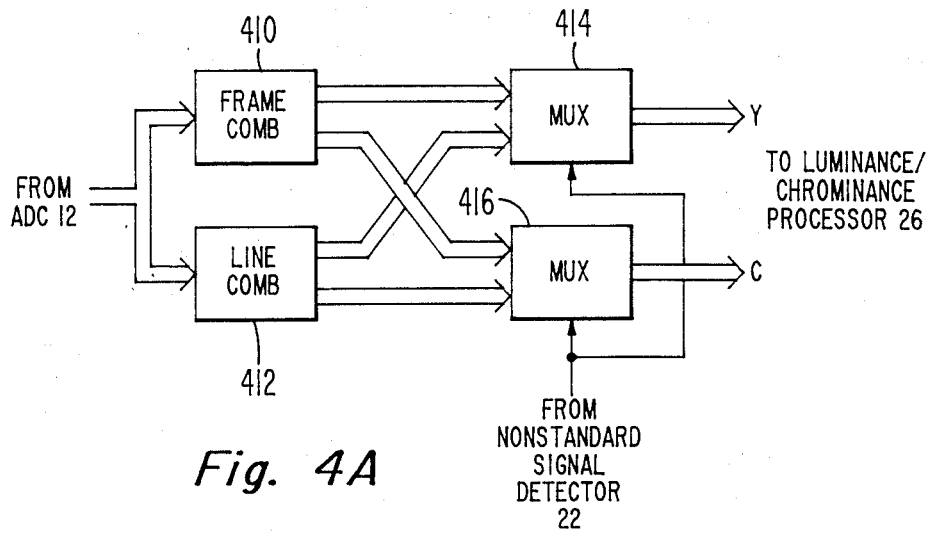
FIG. 4A is a block diagram showing an adaptive comb filter suitable for use with the embodiment shown in FIG. 1.

FIG. 4A is a block diagram of an adaptive frame comb filter which may be used in the present embodiment of the invention. Composite video samples are simultaneously applied to a conventional frame comb filter 410 and to a conventional line comb filter 412. The luminance signals from the frame comb filter 410 and from the line comb filter 412 are applied to separate data input ports of multiplexer 414. Similarly, the chrominance signals from filters 410 and 412 are applied to separate data input ports of multiplexer 416. The signal provided by nonstandard signal detector 22 is applied to the control input terminals of multiplexers 414 and 416. Each of the multiplexers 414 and 416 is configured to pass the signal from the frame comb when the control signal is in a logic high state and to pass the signal from the line comb when the control signal is in a logic low state. As stated above, the control signal changes to a logic high state only after one frame of standard signals has been received. This allows the frame comb filter 410 to accumulate one frame of standard samples before frame memory processing is resumed.

Figure 4B:
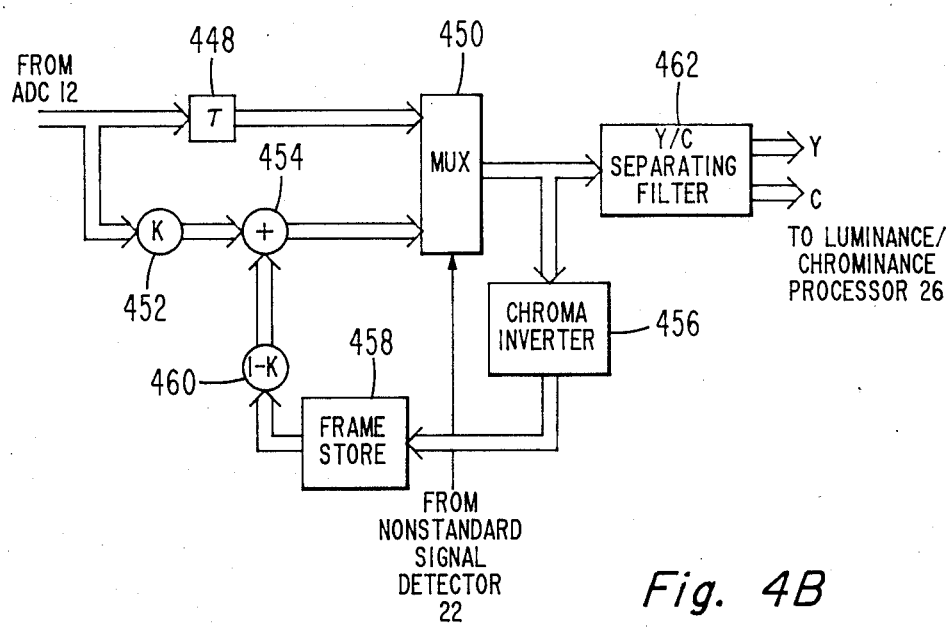
FIG. 4B is a block diagram showing a recursive noise reducing filter suitable for use with the embodiment of the invention shown in FIG. 1.

FIG. 4B is a block diagram of a recursive noise reducing filter suitable for use with the embodiment of the invention shown in FIG. 1. Composite video samples are applied to sample scaler 452 by ADC 12. Scaler 452 multiplies each of the samples by a scale factor K and applies the scaled samples to one input port of adder 454. Adder 454 adds these scaled samples to corresponding samples from frame store 458 that have been scaled by a factor of $1-K$ in sample scaler 460. The samples developed by adder 454 are applied to one data input port of multiplexer 450. Composite video samples from ADC 12 via delay element 448 are applied to the other data input terminal of multiplexer 450.

Delay element 448 provides compensating delay substantially equal to the processing time through sample scaler 452 and adder 454. The control signal applied to multiplexer 450 is the output signal provided by nonstandard signal detector 22. When this signal is in a logic high state, the multiplexer 450 applies the samples from adder 454 to the input port of Y/C separating filter 462. When the signal from detector 22 is in a logic low state, the multiplexer 450 applies the samples from delay element 448 to filter 462. Y/C separating filter 462 may extract the luminance and chrominance components from the composite video samples by conventional means providing a luminance signal Y and a chrominance signal C to luminance/chrominance processor 26.

Composite video samples from the multiplexer 450 are also applied to the input port of chroma inverter 456. The chroma inverter 456 inverts the chrominance components of these samples. The composite video samples provided by chroma inverter 456 are applied to the frame store 458. Frame store 458 may be a conventional shift register type frame memory. In an NTSC signal processing system, this memory may have 477,750 pixel storage locations.

Samples delayed by one frame time relative to the samples from ADC 12 are applied to the input port of sample scaler 460 by frame store 458. Sample scaler 460 multiplies these samples by a factor of $1-K$. These scaled samples are added to the samples provided by sample scaler 452. The chrominance signal phases of the samples from scalers 452 and 460 are the same because the chroma inverter 456 reverses the phase of the frame delayed samples before applying them to the frame store.

Sample scalers 452 and 460, adder 454, chroma inverter 456 and frame store 458 constitute a conventional one-frame recursive noise reducing filter. A more detailed description of this filter can be found in the article by McMann et al. entitled "A Digital Noise Reducer For Encoded NTSC Signals", *SMPTE Journal*, Vol. 87, No. 3, pp. 129–133 (March, 1978), which is incorporated herein by reference.

Figure 4C:
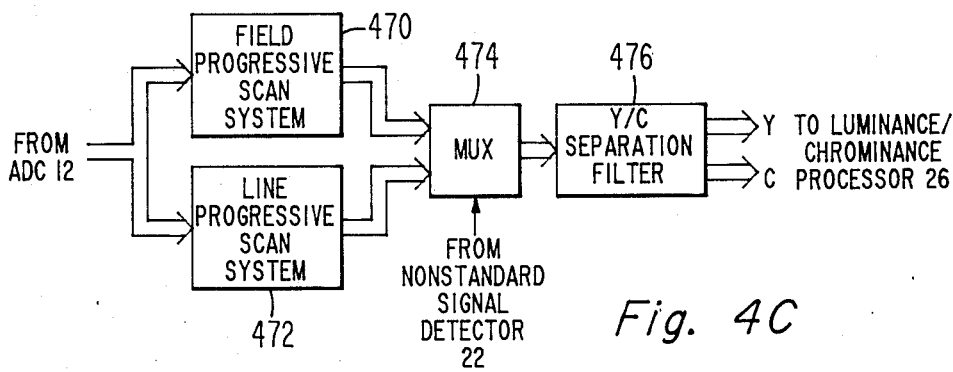
FIG. 4C is a block diagram showing an adaptive field progressive scan system suitable for use with the embodiment of the invention shown in FIG. 1.

FIG. 4C is a block diagram of an adaptive interlace scan to progressive scan conversion system which uses a field store memory. An interlace scan to progressive scan conversion system may be used, for example, in a television receiver to reduce the loss of vertical resolution and frame-rate flicker artifacts of an interlaced scan signal. Systems which display a progressive scan image double the number of lines in each field and the rate at which the lines processed to display a full image frame during each field period. Two types of progressive scan systems that are known in the art are field progressive scan systems and line progressive scan systems.

A typical field progressive scan system is described in U.S. Pat. No. 4,426,661 entitled "Television Receiver Including A Circuit For Doubling Line Scanning Frequency" which is hereby incorporated by reference. In this system, composite video signals are delayed one field time and applied along with undelayed signals to a speed-up circuit. The speed-up circuit doubles the scan rate of each of the signals and inserts the field-delayed lines in-between-the undelayed lines. This signal is displayed at twice the rate of the interlaced signal to provide a progressive scan image.

U.S. Pat. No. 4,415,931 entitled "Television Display With Doubled Horizontal Lines", hereby incorporated by reference, describes a line progressive scan system. In this system, each line of each field is displayed twice in a single field time. This system increases the number of lines in each field but may not provide the same vertical resolution as a field progressive scan system. However, a line progressive scan system may produce a better image than a field progressive scan system when nonstandard signals are being processed. The field-to-field correlation errors which may occur in nonstandard signals may cause a field progressive scan system to display a jagged image while causing almost no distortion in a line progressive scan system.

In FIG. 4C, composite video signals from ADC 12 are applied to both the field progressive scan system 470 and to the line progressive scan system 472. The double-rate signals provided by systems 470 and 472 are applied to the two data input ports of multiplexer 474. The control signal input terminal of multiplexer 474 is coupled to nonstandard signal detector 22. Multiplexer 474 is configured to pass the double-rate signal from the field progressive scan system 470 when the control signal from detector 22 is in a logic high state and to pass the signal from the line progressive scan system 472 otherwise. The signal provided by multiplexer 474 is applied to Y/C separation filter 476, which may separate the luminance and chrominance components from the composite video samples by conventional means to provide a luminance signal, Y, and a chrominance signal, C, to luminance/chrominance processor 26.

Although the present embodiment of the invention is a digital color television signal processing system including a field or frame memory processor, it is contemplated that the invention may also be practiced in an analog system which uses a charge-coupled device (CCD) or delay line field or frame store memory. It is also contemplated that the invention may be used in systems which store frames or fields of processed video signals as well as in systems which store composite video signals.

What is claimed is:

1. In a video signal processing system including a source of composite vide signal which includes a horizontal line synchronizing signal component, and a video signal processor which combines the signal from said source with a stored signal from a prior field to produce a processed video signal, apparatus comprising:
   a nonstandard signal detector coupled to said source for developing a control signal which is in a first state when said horizontal line synchronizing component has a frequency which substantially conforms to a frequency determined by a ratio between horizontal line frequency and color subcarrier signal frequency established for a predetermined video signal standard and which is in a second state otherwise; and
   adapting means coupled to said video signal processor and being responsive to said control signal for changino the method by which said video signal processor uses said stored signals.

2. The apparatus set forth in claim 1 wherein said adapting means comprises means for disabling the processing of said stored signal by said video signal processor in response to said control signal being in said seoond state.

3. In a video signal processing system including a source of composite video signal which includes a luminance signal component, a horizontal line synchronizing signal component, and a vertical field synchronizing signal component, apparatus comprising:
   a nonstandard signal detector coupled to said source for developing a control signal which is in a first state when the frequency of the horizontal line synchronizing signal does not vary significantly from a frequency determined by a ratio between horizontal line frequency and color subcarrier signal frequency established for a predetermined video signal standard and which is in a second state otherwise;
   means coupled to said nonstandard signal detector and to said source of composite video signal for developing an indicating signal which changes from said first state to said second state substantially coincident with said control signal and which changes from said second state to said first state after said control signal has been in said first state for two consecutive periods of said vertical field synchronizing signal component;
   signal processing means coupled to said source of composite video signal for storing at least one field of signal from said source and for combining the signal provided by said source with the stored signal to produce a processed signal; and
   adapting means coupled to said signal processing means and responsive to said indicating signal for changing the manner in which said stored signal is used by said signal processing means.

4. The apparatus set forth in claim 3 wherein said adapting means comprises means for disabling the processing of said stored signal by said signal processing means in response to said indicating signal being in said second state.

5. The apparatus set forth in claim 3 wherein:
   the composite video signal provided by said source further includes a chrominance signal component;
   said signal processing means comprises a frame comb filter for separating the luminance and chrominance signal components from said composite video signal and alternative means, not including a frame memory, for separating the luminance and chrominance signal components of said composite video signal; and
   said adapting means includes means responsive to said indicating signal for switching said signal processing means between providing the luminance and chrominance signal components produced by said frame comb filter and the luminance and chrominance signal components produced by said alternative means in response to said indicating signal being in said first and second states respectively.

6. The apparatus set forth in claim 3 wherein said signal processing means comprises:
   a memory system having an input port and an outout port and a sufficient number of cells to store at least one frame of composite video signal;
   first means coupled to said source of composite video signal and to the output port of said memory system for combining said composite video signal from said source and the stored composite video signal from said memory system to produce a temporally averaged composite video signal;
   second means coupled to said first means and to the input terminal of said memory system for storing the temporally averaged composite video signal in said memory system.

7. The apparatus set forth in claim 6 wherein said adapting means comprises:
   means responsive to said indicating signal and coupled to said source of composite video signal and to said first means for providing the signal from said first means when the indicating signal is in said first state and for providing the signal from said source when the indicating signal is in said second state.

8. The apparatus set forth in claim 3 2herein said source of composite video signal provides an interlace scan signal and wherein said signal processing means comprises:
   memory means coupled to said source for storing at least one field of said interlace scan signal;
   main scan converting means coupled to said memory means and to said source for combining said stored signal with the signal provided by said source to produce a progressive scan signal.

9. The apparatus set forth in claim 8 wherein:

said signal processing means further comprises alternative scan converting means, coupled to said source and not including a field memory for converting said interlace scan signal into a progressive scan signal; and said adapting means comprises means coupled to said main scan converting means, to said alternative scan converting means, and to said nonstandard signal detector for providing the signal from said main scan converting means when said indicating signal is in said first state and from said alternative scan converting means otherwise.

10. The apparatus set forth in claim 3 wherein:

said signal processing means includes main signal processing means having at least one field of memory and alternative signal processing means which does not have one field of memory; and said adapting means comprises means coupled to said nonstandard signal detector and to said signal processing means for providing the signal from said main signal processing means when said indicating signal is in said first state and from said alternative signal processing means otherwise.

11. In a video signal processing system including a source of composite video signal which nominally conforms to a video signal standard, said composite video signal having a luminance signal component, a color synchronizing burst signal component, a horizontal line synchronizing signal component, and a vertical field synchronizing signal component, apparatus comprising:

a nonstandard signal detector coupled to said source for developing a control signal which is in a first state when the frequency ratio of the color synchronizing burst signal component and the horizontal line synchronizing signal component does not vary significantly from a ratio set by said video signal standard and which is in a second state otherwise;

means coupled to said nonstandard signal detector and to said source of composite video signal for developing an indicating signal which changes from said first state to said second state substantially coincident with said control signal and which changes from said second state to said first state after said control signal has been in said first state for two consecutive periods of said vertical field synchronizing signal component;

main signal processing means coupled to said source of composite video signal for storing at least one field of the signal from said source and for combining the signal provided by said source with the stored signal to produce a processed signal;

altervative signal processing means coupled to said source of composite video signal and including substantially less than one field of signal storage for producing an alternatively processed signal; and adapting means coupled to said main and alternative signal processing means and responsive to said indicating signal being in said first and second states for providing the processed signal from said main and alternative signal processing means respectively.

12. In a video signal processing system that includes a source of composite video signal which includes a horizontal line synchronizing signal component and a color synchronizing burst signal component and a video signal processor that combines the signal from said source with a stored signal from a piror field to produce a processed video signal, a method, comprising the steps of:

detecting when the frequency of the horizontal line synchronizing signal varies significantly from the frequency determined by a standard ratio between the respective frequencies of the horizontal line synchronizing signal component and the color reference burst signal component established for a predetermined video signal standard; and changing to alternative means for providing alternatively processed video signals when significant variations are detected in the frequency ratio of the color synchronizing burst signal to the horizontal line synchronizing signal relative to said standard ratio.

* * * * *